(12) United States Patent
Wagoner et al.

(10) Patent No.: US 8,812,207 B2
(45) Date of Patent: Aug. 19, 2014

(54) METHOD OF ADDRESSING AND CORRECTING MISMATCHES BETWEEN E-SHIFT POSITION AND ACTUAL TRANSMISSION GEAR

(71) Applicants: Brian L Wagoner, Farmington Hills, MI (US); Eugene Karpinsky, Oak Park, MI (US); Matthew S Martin, Chesterfield, MI (US); Michael F Tefend, Lake Orion, MI (US); Steven R Hoskins, Walled Lake, MI (US)

(72) Inventors: Brian L Wagoner, Farmington Hills, MI (US); Eugene Karpinsky, Oak Park, MI (US); Matthew S Martin, Chesterfield, MI (US); Michael F Tefend, Lake Orion, MI (US); Steven R Hoskins, Walled Lake, MI (US)

(73) Assignees: Chrysler Group LLC, Auburn Hills, MI (US); Kostal of America, Troy, MI (US)

( * ) Notice: Subject to any disclaimer, the term of this patent is extended or adjusted under 35 U.S.C. 154(b) by 0 days.

(21) Appl. No.: 13/670,824

(22) Filed: Nov. 7, 2012

(65) Prior Publication Data
US 2014/0129102 A1    May 8, 2014

(51) Int. Cl.
| | | |
|---|---|---|
| *G06F 17/00* | (2006.01) | |
| *F16H 59/02* | (2006.01) | |
| *F16H 61/02* | (2006.01) | |
| *F16H 63/42* | (2006.01) | |
| *F16H 61/12* | (2010.01) | |

(52) U.S. Cl.
CPC ............ *F16H 61/0213* (2013.01); *F16H 63/42* (2013.01); *F16H 61/12* (2013.01)
USPC .................. 701/64; 701/51; 701/53; 701/62; 74/473.15; 74/473.3

(58) Field of Classification Search
USPC .............. 701/51–64; 700/3; 477/3, 110, 116, 477/125, 129; 475/155, 158; 180/337; 74/473.3, 473.13, 473.15, 335
See application file for complete search history.

(56) References Cited

U.S. PATENT DOCUMENTS

| | | | |
|---|---|---|---|
| 5,117,710 A | 6/1992 | Asano et al. | |
| 6,139,468 A * | 10/2000 | Goates et al. | 477/97 |
| 6,918,314 B2 * | 7/2005 | Wang | 74/335 |
| 6,948,395 B2 * | 9/2005 | Gierer et al. | 74/335 |
| 6,996,465 B2 * | 2/2006 | Kim | 701/51 |
| 7,572,203 B2 * | 8/2009 | Kashiwagi et al. | 477/34 |
| 8,066,615 B2 * | 11/2011 | Martini et al. | 477/3 |
| 8,387,478 B2 * | 3/2013 | Park et al. | 74/335 |
| 2004/0226801 A1 * | 11/2004 | De Jonge et al. | 192/220.7 |
| 2006/0053930 A1 * | 3/2006 | Morita et al. | 74/473.18 |

(Continued)

FOREIGN PATENT DOCUMENTS

| | | |
|---|---|---|
| EP | 1657475 A1 | 5/2006 |
| WO | 2011143178 A2 | 11/2011 |
| WO | 2012064899 A1 | 5/2012 |

OTHER PUBLICATIONS

Compendium of Automotive Manufacturer Gear Shift Products on the Market, Dated: 2002-2010, pp. 1-13.*

(Continued)

*Primary Examiner* — Thomas Tarcza
*Assistant Examiner* — Tyler J Lee
(74) *Attorney, Agent, or Firm* — Ralph E Smith

(57) ABSTRACT

A method and apparatus for detecting and correcting mismatches between an electronic shifter position and a vehicle's actual transmission gear. The method and system implement a correction scheme that may initially set a period for manual correction, if possible, then initiate automatic correction if correction is required.

14 Claims, 3 Drawing Sheets

(56) References Cited

U.S. PATENT DOCUMENTS

2010/0071506 A1* 3/2010 Kliemannel et al. ............ 74/625
2012/0285284 A1* 11/2012 Wang ........................... 74/473.3
2013/0061706 A1* 3/2013 Wang ......................... 74/473.15

OTHER PUBLICATIONS

International Search Report and Written Opinion dated Feb. 18, 2014 for International Application No. PCT/US2013/068901, International Filing Date Nov. 7, 2013.

* cited by examiner

METHOD OF ADDRESSING AND CORRECTING MISMATCHES BETWEEN E-SHIFT POSITION AND ACTUAL TRANSMISSION GEAR

FIELD

The present disclosure relates to detecting and correcting mismatches between an electronic shifter position and a vehicle's actual transmission gear.

BACKGROUND

More and more vehicles are being equipped with electronic shifters ("e-shifters") to place the vehicle's automatic transmission into the desired gear state. Electronic shifters replace the traditional console mounted P-R-N-D-L shift lever and are typically implemented as levers, which can be pushed up/down or sideways, and/or buttons to effect gear changes. The lever-type electronic shifter returns to its original position after it has been manipulated by the driver. As such, the vehicle's dashboard, console or e-shifter provides a gear position indicator to make sure that the driver knows what gear the vehicle is in.

A more recent development is to have a multi-position stable e-shifter (e.g., a dial or knob) that retains an actuator setting that represents a driver requested gear state. This way the driver can readily determine what gear was selected. Because of this, the multi-position stable e-shifter is preferred by many drivers.

There are times, however, that the gear selected by the electronic shifter will not match the vehicles actual gear position. This may occur when the operator attempts a gear change that the vehicle is programmed not to make (e.g., to prevent an unintended condition or damage to the transmission). For example, a vehicle is often programmed to prevent it from being placed into reverse (R) from drive (D) when the vehicle's forward speed is above a certain speed threshold. When this happens, the electronic shifter's gear selection will not match the actual transmission gear. Accordingly, there is a need for improvement in the art.

SUMMARY

In one form, the present disclosure provides a method of detecting and correcting mismatches between an electronic shifter position and a vehicle's actual transmission gear. The method comprises determining that a current electronic shifter position is not a valid position based on the actual transmission gear and vehicle operating conditions; initiating a manual electronic shifter position correction period if the vehicle operating conditions allow; determining if the electronic shifter position has been corrected to a valid position; and initiating an automatic electronic shifter position correction if it is determined that the electronic shifter position has not been corrected to a valid position. The method can also return the electronic shifter to normal operating mode after initiating automatic electronic shifter position correction.

The present disclosure also provides an apparatus for detecting and correcting mismatches between an electronic shifter position and a vehicle's actual transmission gear. The apparatus comprises a transmission control module for controlling the actual transmission gearing and inputting vehicle operating conditions, and a shift by wire module. The transmission control module determines that a current electronic shifter position is not a valid position based on the actual transmission gear and vehicle operating conditions; initiates a manual electronic shifter position correction period if the vehicle operating conditions allow; determines if the electronic shifter position has been corrected to a valid position; and initiates an automatic electronic shifter position correction if it is determined that the electronic shifter position has not been corrected to a valid position. The apparatus can also return the electronic shifter to normal operating mode after initiating automatic electronic shifter position correction.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1A:
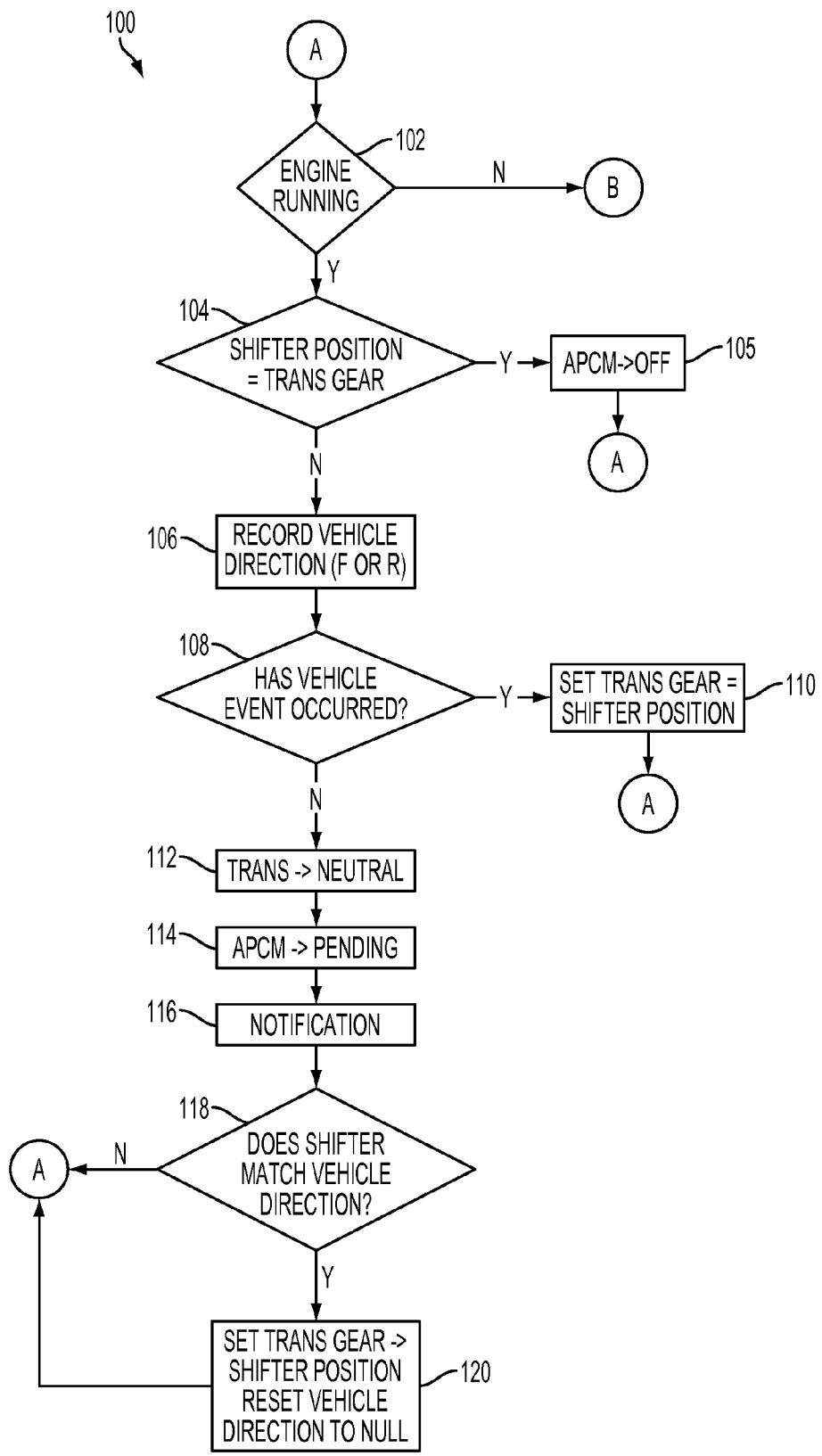
FIGS. 1a-1b illustrate a flowchart of a method of detecting and correcting mismatches between an electronic shifter position and a vehicle's actual transmission gear.
Figure 1B:
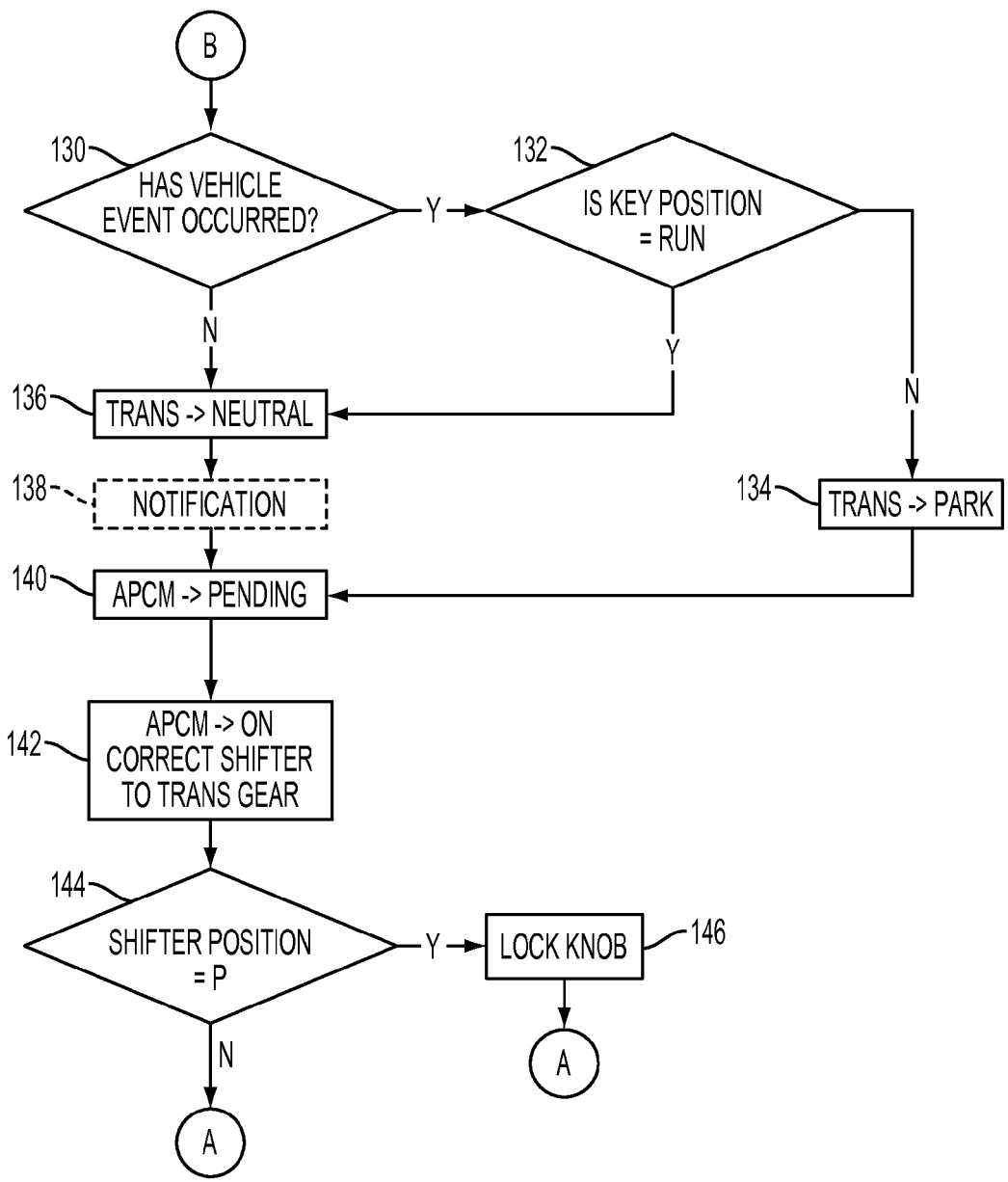

FIGS. 1a-1b illustrate a method 100 of detecting and correcting mismatches between an electronic shifter position and a vehicle's actual transmission gear in accordance with the principles disclosed herein. In the following disclosure, the e-shifter is implemented as a selection mechanism and is sometimes referred to herein as a knob for example purposes only; it should be appreciated that the novel aspects disclosed herein are suitable for use with any multi-position stable e-shifter.

The method 100 may utilize an automatic position correction mode (APCM) when correcting mismatches. As discussed below, the APCM will have different states. An APCM OFF state means that automatic position correction is not active. The APCM state can transition to an APCM Pending state upon the occurrence of an APCM Pending request command signal or message from the transmission control module (TCM). During the APCM Pending state, the TCM and shift by wire module (SBWM) do not lock the shifting mechanism (e.g., knob). This way a driver is permitted to manually adjust the desired gear state if necessary (discussed below in more detail). An APCM ON state will cause a locking of the knob such that the driver cannot manually adjust the desired/requested state during the automatic position control sequence.

As will be discussed below, APCM Pending is a period in which the driver is allowed to manually adjust the desired/requested state selection (i.e., re-position the e-shifter). An APCM Pending timer can be set to a predetermined value to allow for the correction. Alternatively, the timer can be set to infinity under certain circumstances to allow for the use of a vehicle event (such as e.g., vehicle speed) as the determining factor.

The APCM state can be set back to the APCM OFF state from the Pending state upon the occurrence of an APCM OFF signal or message from the TCM. The APCM state can be set to the APCM ON state from the Pending state upon the occurrence of an APCM ON signal or message from the TCM. The APCM ON state means that automatic position correction is commanded to take place. In one embodiment, if the TCM issues the APCM ON command, the SBWM executes an automatic correction in the following in sequence: 1) lock the knob; 2) correct position; and 3) unlock the knob, if appropriate.

The method 100 will occur after a self-initialization process is performed. The self-initialization will occur at vehicle off and before the transmission wakes or the transmission control module (TCM) is activated The e-shifter will perform a self-check (initialization) when the driver's door opens, or if remote door unlock or remote start key fob button is pressed (either of these actions tells the bus to wake up, and it is the waking-up of the bus (e.g., bus 440 illustrated in FIG. 2) that wakes up the shift by wire module (SBWM); the TCM wakes on the transition from the key "off" position to e.g., the "ACC" (accessories) position).

The self-initialization process will perform a check to determine if the e-shifter is in the park position and the e-shifter KNOB is locked. If the e-shifter is in the park position and the e-shifter KNOB is locked, then the check is complete. Otherwise, the e-shifter initiates auto correction to allow the itself, not the driver, to perform the correction to the park position. As is discussed below, the auto correction typically occurs when the TCM issues an APCM ON, but during the self-initialization, the e-shifter itself can initiate the auto correction.

Figure 2:
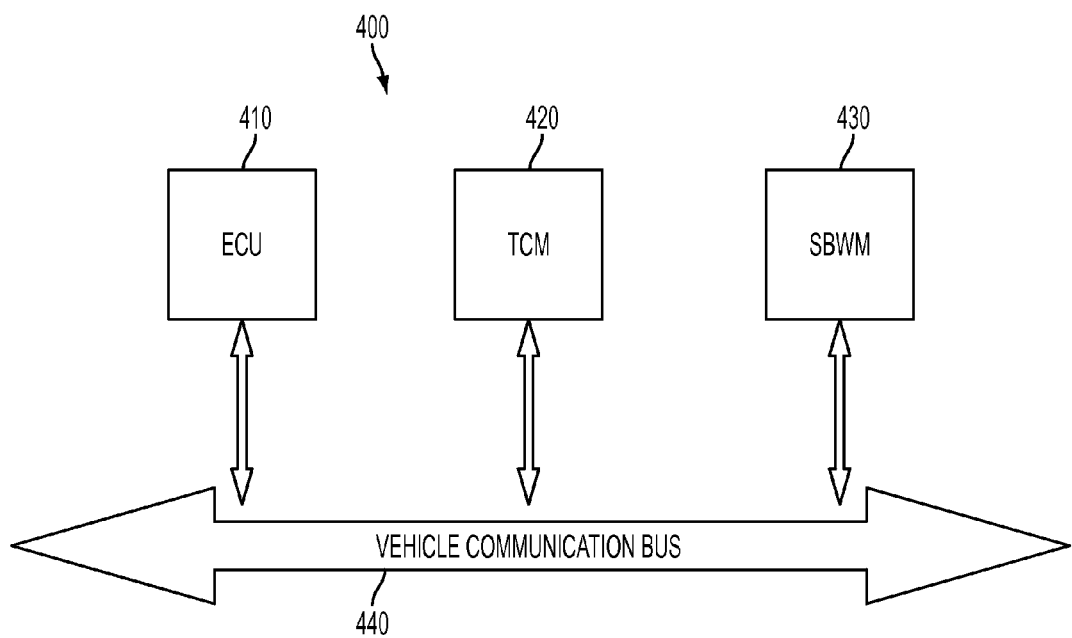
FIG. 2 is a block diagram of an apparatus for carrying out the method of FIGS. 1a-1b.

The method 100 may be implemented in an apparatus 400 comprising an engine control unit (ECU) 410, transmission control module (TCM) 420 and shift by wire module (SBWM) 430 such as the one illustrated in FIG. 2. The SBWM 430 broadcasts the driver requests while the TCM 420 controls the actual physical state of the transmission. Fundamentally, there is a master-slave relationship where the TCM 420 (master) controls all functions based on the knob position that is broadcast and appropriate vehicle operation. The SBWM 430 is a slave to the TCM 420 and can correct a knob position based on a TCM command. Communication within the system is done with appropriate standard communication protocol over bus 440. In one embodiment, the method 100 is performed by the TCM 420. It should be appreciated that the method 100 may be executed by the SBWM 430, which receives TCM initiated commands. It should be appreciated the novel disclosure provided herein is not limited to what component/control mechanism executes the method 100.

Referring again to FIGS. 1a-1b, the method 100 begins at step 102 where it is determined if the engine is running or not. If the engine is running, the method continues at step 104. Otherwise, the method 100 continues at step 130 (FIG. 1b).

At step 104, the e-shifter position is compared to the transmission's actual gear state to see if they are the same. If it is determined that the e-shifter position is set to a gear state that is the same as the transmission's actual gear state, the method 100 continues at step 105 where the APCM is set to APCM OFF by the TCM. That is, no automatic correction is required. After step 105, the method continues at step 102 where the method 100 can be repeated. If at step 104, however, it is determined that the e-shifter position is set to a gear state that is not the same as the transmission's actual gear state, there is a mismatch and the method 100 continues at step 106.

At step 106, the vehicle's current direction (i.e., forward (F) or reverse (R)) are recorded. At step 108, it is determined whether a vehicle event has occurred that may impact correcting the mismatch detected at step 104. The vehicle event can include e.g., detecting that the vehicle's speed (Vs) is less than a predetermined threshold. In one example embodiment, the predetermined threshold is 2 kph. If it is determined that a vehicle event has occurred, the method 100 continues at step 110 where the transmission's gear state is set to the knob position. After step 110, the method continues at step 102 where the method 100 can be repeated.

If at step 108, however, it is determined that a vehicle event has not occurred, the mismatch still needs to be corrected and the method 100 continues at step 112. At step 112, the transmission is placed into neutral (N) by the TCM. The neutral gear state is a default safe gear state that is used when mismatches are detected and the potential for unsafe operation is present. At step 114, the TCM sets the value of APCM to Pending. This initiates a period in which the driver can manually correct the mismatch. At step 116, a notification of the mismatch is provided. This notification can include a visual display on the windshield or instrument panel of the vehicle, an audible sound or message and/or an indication on the e-shifter itself (i.e., the e-shifter can blink or vibrate). In one example embodiment, the error state blinks on both the instrument panel and the e-shifter, and a message (e.g., "Speed too high to shift gear") is displayed on the panel. In this embodiment, the "error state" is the wrong selection. For example, if the vehicle is moving forward at a high speed when the knob is moved to R, R is the error state and will blink on the instrument panel and the e-shifter.

At step 118, a check (or series of checks) is made to determine whether the gear state associated with the e-shifter position matches the recorded vehicle direction. The purpose of this check is to allow a secondary selection by the driver (after he/she made a mistake) that makes sense given the vehicle's operational state. This determination can include determining whether the vehicle is moving forward and the e-shifter position is reset to a forward drive (D) position or whether the vehicle is moving backwards and the e-shifter position is reset to reverse (R). In one embodiment, a match is declared when the vehicle is moving forward and the e-shifter position is reset to a forward drive (D) position or when the vehicle is moving backwards and the e-shifter position is reset to reverse (R).

If there is a match at step 118, the transmission gear state is set to the gear state associated with the e-shifter position at step 120. The recorded vehicle direction will be cleared out or set to a NULL value at step 120 too. After step 120, or if there is a mismatch at step 118, the method 100 continues at step 102 (discussed above).

If at step 102, it was determined that the engine was off (e.g., vehicle is stopped and driver turns the key "off" before shifting out of D, vehicle runs out of gas, or engine failure), the method 100 continues at step 130. At step 130, it is determined whether a vehicle event has occurred. Vehicle events at step 130 can include e.g., detecting that the vehicle's speed (Vs) is less than a predetermined threshold. In one example embodiment, the predetermined threshold is 2.0 kph.

If it is determined that a vehicle event has been detected, the method 100 continues at step 132 to determine if the ignition key's position is in the "run" position (also known as the "on" position in some vehicles). If it is determined that the ignition key's position is not in the "run" position, the method 100 continues at step 134 where the transmission gear state is set to park (P). The method 100 then continues at step 140.

If it is determined that the ignition key's position is in the "run" position (at step 132), or if no vehicle event was detected (at step 130), the method 100 continues at step 136 where the transmission gear state is set to Neutral (N). The method 100 may then provide a notification at optional step 138, if desired. The notification can be any or all of the notifications discussed above with respect to step 116. At step 140, the TCM commands the APCM to APCM Pending. At step 142, automatic correction is turned on when the TCM issues the command APCM ON. The automatic correction will correct the e-shifter position such that it matches the actual transmission gear state. It should be appreciated that if desirable, the APCM could be commanded to APCM ON at step 142 without first performing step 140 (i.e., without going to Pending first) since there will be no time for a driver to make a manual correction at this point. Thus, the disclosed principles should not be limited to performing step 140 prior to step 142.

At step 144, it is determined whether the e-shifter position is currently set to park (P) and if so, the method 100 confirms that the e-shifter knob is locked at step 146. Step 146 could also include allowing the ignition key to be placed in the OFF position so that the key can be removed, if desired. After step 146, or if it is determined that the e-shifter is not in park (P) at step 144, the method continues at step 102.

As can be seen, the method 100 and apparatus 400 disclosed herein are capable of detecting and correcting mismatches between an electronic shifter position and a vehicle's actual transmission gear. The disclosed method 100 and apparatus 400 initially set a period for manual correction, then initiate automatic correction if manual correction does not occur. Automatic correction is a function that can be active during normal vehicle operation (engine running) or during rare or unusual vehicle operating states (run out of gas, engine failure, etc.) or both. The method 100 and apparatus 400 compensate for uni-directional and bi-directional operation of the e-shifter, can detect multiple erroneous scenarios and can process sequential mismatches—none of which can be performed in today's vehicles.

What is claimed is:

1. A method of detecting and correcting mismatches between an electronic shifter position and a vehicle's actual transmission gear, said method comprising:
   determining, by a control module, that a current electronic shifter position is not a valid position based on the actual transmission gear and vehicle operating conditions;
   initiating a manual electronic shifter position correction period if the vehicle operating conditions allow by setting a timer to a predetermined value to allow for manual correction;
   determining, by the control module, if the electronic shifter position has been corrected to a valid position before the predetermined value of the timer has elapsed; and
   initiating an automatic electronic shifter position correction after it is determined that the electronic shifter position has not been corrected to a valid position during the manual electronic shifter position correction period.

2. The method of claim 1, further comprising the step of turning off the automatic electronic shifter position correction after the initiated automatic electronic shifter position correction is successfully completed.

3. The method of claim 1, wherein the step of initiating manual electronic shifter position correction comprises:
   preventing the actual transmission gear from being changed to a gear associated with the electronic shifter position; and
   outputting an indication within the vehicle regarding the status of the electronic shifter position.

4. The method of claim 1, wherein the step of initiating automatic electronic shifter position correction comprises:
   preventing the actual transmission gear from being changed to a gear associated with the electronic shifter position; and
   alerting a controller for the electronic shifter that automatic correction of the electronic shifter position is required.

5. The method of claim 4, further comprising the step of displaying a visual indication within the vehicle regarding the status of the electronic shifter position.

6. The method of claim 4, further comprising the step of outputting an audible indication regarding the status of the electronic shifter position.

7. The method of claim 1, wherein the vehicle operating conditions include vehicle speed.

8. The method of claim 1, wherein the step of determining that a current electronic shifter position is not a valid position comprises determining that the current electronic shifter position does not match the actual transmission gear, the electronic shifter position is inappropriate given the vehicle's current operational state and that a vehicle speed is above a predetermined threshold.

9. An apparatus for detecting and correcting mismatches between an electronic shifter position and a vehicle's actual transmission gear, said apparatus comprising:
   a transmission control module for controlling the actual transmission gearing and inputting vehicle operating conditions; and
   a shift by wire module in communication with the transmission control module, wherein said transmission control module:
   determines that a current electronic shifter position is not a valid position based on the actual transmission gear and vehicle operating conditions;
   initiates a manual electronic shifter position correction period if the vehicle operating conditions allow;
   sets a timer to a predetermined value to allow for manual correction;
   determines if the electronic shifter position has been corrected to a valid position before the predetermined value of the timer has elapsed; and
   initiates an automatic electronic shifter position correction after it is determined that the electronic shifter position has not been corrected to a valid position during the manual electronic shifter position correction period.

10. The apparatus of claim 9, wherein the transmission control module turns off the automatic electronic shifter position correction after the initiated automatic electronic shifter position correction is successfully completed.

11. The apparatus of claim 9, wherein initiating manual electronic shifter position correction comprises:
   preventing the actual transmission gear from being changed to a gear associated with the electronic shifter position; and
   outputting an indication within the vehicle regarding the status of the electronic shifter position.

12. The apparatus of claim 9, wherein initiating automatic electronic shifter position correction comprises:
   preventing the actual transmission gear from being changed to a gear associated with the electronic shifter position; and
   setting an operating state to automatic correction of the electronic shifter position is required.

13. The apparatus of claim 9, wherein the vehicle operating conditions include vehicle speed.

14. The apparatus of claim 9, wherein determining that a current electronic shifter position is not a valid position comprises determining that the current electronic shifter position does not match the actual transmission gear, the electronic shifter position is inappropriate given the vehicle's operational state and that a vehicle speed is above a predetermined threshold.

* * * * *